UNITED STATES PATENT OFFICE.

LEON McCULLOCH, OF WILKINSBURG, PENNSYLVANIA, ASSIGNOR TO WESTINGHOUSE ELECTRIC AND MANUFACTURING COMPANY, A CORPORATION OF PENNSYLVANIA.

COMPOSITE INSULATING MATERIAL AND PROCESS OF MAKING THE SAME.

1,286,043.     Specification of Letters Patent.     Patented Nov. 26, 1918.

No Drawing.     Application filed February 3, 1916. Serial No. 75,983.

*To all whom it may concern:*

Be it known that I, LEON MCCULLOCH, a citizen of the United States, and a resident of Wilkinsburg, in the county of Allegheny and State of Pennsylvania, have invented a new and useful Improvement in Composite Insulating Materials and Processes of Making the Same, of which the following is a specification.

My invention relates to composite material suitable for use as heat insulation and electrical insulation, and it has special relation to material composed of flakes of mica or a similar substance cemented together by means of a suitable bond.

Built-up mica plates are usually made by arranging a layer of mica splittings upon a suitable support, coating the layer of mica with a bonding substance, superposing successive alternate layers of mica splittings and bonding material and finally pressing the built-up sheet between heated plates to render the sheet compact and to melt and thoroughly distribute the bond. The bond commonly employed for this purpose is shellac, which is usually applied in solution in methyl-alcohol but which may also be applied in powdered form. Composite mica plates prepared in this manner have the disadvantage, when subjected to high temperatures, that the organic bond is carbonized, with consequent weakening of the material and liberation of objectionable smoke.

According to my present invention, I utilize inorganic bonding substances in the preparation of mica plates and other composite materials and thereby produce a material which withstands high temperatures without alteration.

The bonding materials which I prefer to employ are certain clays and clay-like substances which may be taken up with water to form a plastic and somewhat adhesive paste. The clay-like substance known as bentonite is particularly well adapted for my present purpose. Bentonite, as it occurs in nature, has a horn-like texture, but, when placed in water, it swells largely and forms a very plastic paste. The composition of natural bentonite is approximately as follows:

| | |
|---|---|
| $SiO_2$ | 63.25 |
| $Al_2O_3$ | 17.62 |
| $F_2O_3$ | 3.70 |
| $MgO$ | 3.70 |
| $CaO$ | 4.12 |
| $SO_3$ | 1.53 |
| $H_2O$ | 6.08 |
| | 100.00 |

For my present purpose, bentonite or other clay-like substance is placed in sufficient water to form a thin paste that may be applied by means of a brush. This paste is then used in the ordinary manner, being brushed over successive superposed layers of mica splittings, the built-up plate being then pressed between plates which are not heated sufficiently to destroy the plasticity of the bentonite. The plate may be punched or cut into any desired shape and be then completely dried out in any manner, suitably in an ordinary drying oven.

Composite material prepared in accordance with my present invention is of special utility for use as insulating material in electric heating apparatus and in other electric apparatus where high degrees of heat may be developed. It is also useful as a refractory heat insulating medium and will withstand all temperatures ordinarily found in industrial furnaces. It is to be understood that my invention is not restricted to the precise materials and process steps enumerated above but is limited only by the scope of the appended claims.

I claim as my invention:

1. A composite material comprising bodies of heat-resistant flake material cemented together by means of a bond comprising a paste of water and bentonite.

2. A composite material comprising bodies of heat-resistant flake material cemented together by means of a bond comprising water and a clay.

3. A composite material comprising bodies of heat-resistant material cemented together by means of a bond comprising a paste of water and bentonite.

4. A composite material comprising bodies of heat-resistant flake material cemented together by means of an argillaceous bond.

5. Composite insulating material comprising flakes of mica cemented together by means of an argillaceous bond.

6. Composite insulating material comprising flakes of mica cemented together by means of a bond comprising a paste of water and a cementitious clay.

7. Composite insulating material comprising flakes of mica cemented together by means of a bond comprising a paste of water and bentonite.

8. The process of making composite insulating material composed of flake material and a binder which comprises arranging and superposing the flake material, coated with an argillaceous liquid bond, pressing the assembled material, and drying the resulting product.

9. The process of making composite insulating material composed of mica and a binder which comprises arranging and superposing mica flakes coated with a paste of bentonite and water, pressing the assembled material and drying the resulting product.

In testimony whereof I have hereunto subscribed my name this 27th day of Jan., 1916.

LEON McCULLOCH.